United States Patent [19]

Baugh

[11] Patent Number: 4,648,629

[45] Date of Patent: Mar. 10, 1987

[54] UNDERWATER CONNECTOR

[75] Inventor: Hollis A. Baugh, Houston, Tex.

[73] Assignee: Vetco Offshore, Inc., Ventura, Calif.

[21] Appl. No.: 729,460

[22] Filed: May 1, 1985

[51] Int. Cl.$^4$ ............................................. F16L 35/00
[52] U.S. Cl. ....................................... 285/26; 285/320;
   285/920; 403/322; 403/338; 405/169; 405/224
[58] Field of Search ....................... 285/24, 25, 26, 27,
   285/28, 29, 315, 320, 920; 166/338-351;
   114/293-297; 405/224, 169, 170, 171; 403/322,
   338

[56] References Cited

U.S. PATENT DOCUMENTS

| | | | |
|---|---|---|---|
| 3,240,511 | 3/1966 | Bishop et al. | 285/315 X |
| 3,413,692 | 12/1968 | Pressley | 403/325 X |
| 3,701,549 | 10/1972 | Koomey et al. | 285/24 |
| 3,817,281 | 6/1974 | Lewis et al. | 285/24 X |
| 3,840,071 | 10/1974 | Baugh et al. | 285/26 X |
| 4,223,920 | 9/1980 | Bilderbeck | 285/24 |
| 4,411,454 | 10/1983 | Mayler et al. | 285/26 |

Primary Examiner—Dave W. Arola
Attorney, Agent, or Firm—Edward L. Kochey, Jr.

[57] ABSTRACT

A subsea control pod connector for joining conical interfaces (12, 18) having fluid openings (14, 20). A latch rod (54) carries a spherical ball (56) for vertical axial movement. A plurality of outwardly extending lock dogs (65) each has a spherical inner surface (66) sliding on the ball and an annular groove (72) around the outer surface. The groove surface transmits locking force to shoulder surfaces 68 and 70 located on the members to be joined.

26 Claims, 6 Drawing Figures

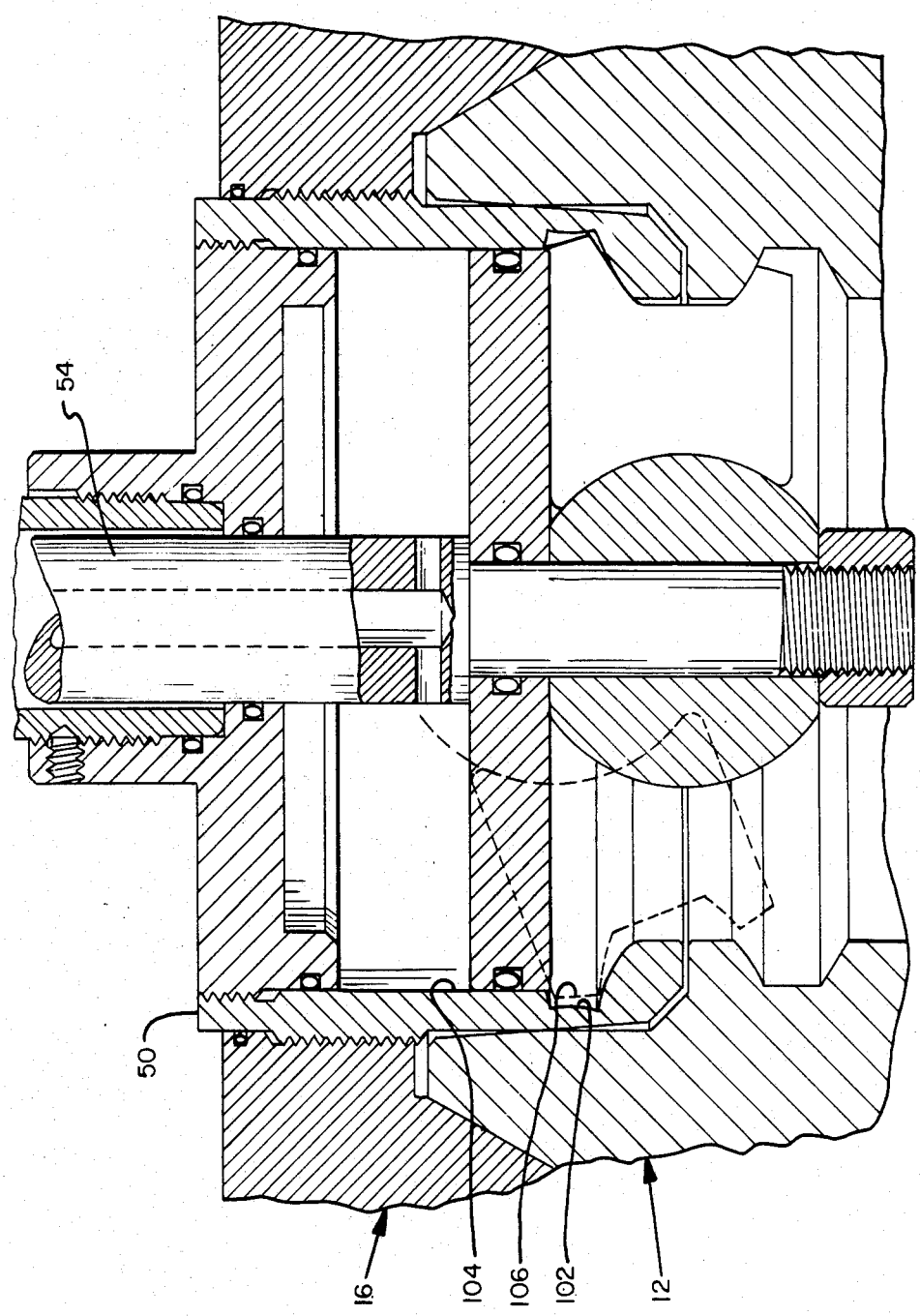

UNDERWATER CONNECTOR

BACKGROUND OF THE INVENTION

The invention relates to subsea connection apparatus and in particular to a connector for a generally cylindrical hydraulic control pod.

When oil or gas is to be produced from subsea wells, there is a need from various releasable connectors. With various hydraulic controls being used it is desirable to use a detachable and retrievable control pod so that the controlling apparatus maybe retrieved to the surface for repair if required. Since the hydraulic fluid used for control must pass between the wellhead structure and the control pod complimentary fluid openings must be aligned and sealed.

The mating surfaces should be preloaded and held in firm contact against various loads which may occur and which may vary in direction and magnitude. It is therefore desirable to secure the connection in as symmetrical a pattern as possible since the loading may occur in any direction.

Various linkages to accomplish this lockdown of control connectors are shown in U.S. Pat. No. 3,701,549 to Paul C. Koomey et al, U.S. Pat. No. 3,817,281 to George E. Lewis et al and U.S. Pat. No. 3,840,071 to Hollis A. Baugh et al. U.S. Pat. No. 4,223,920 to Bernard Van Bilderbeek shows a lock down using wedged dogs.

SUMMARY OF THE INVENTION

The present invention comprises a subsea connector for a control pod using hydraulic controls. It achieves substantial lockdown force to initially energize the seals required around mating fluid openings and provides uniform symmetrical loading to maintain the connector in a secure locked condition. It also has a positive release.

This is accomplished with a spherical ball which may be raised or lowered with a latch rod. A plurality of dogs are slidingly arranged around the sphere so that movement of the ball causes sliding and rotation of the dogs around the center of the ball. The surfaces forming a groove on the outer edge of the dogs coact with mating surfaces on the two members to be connected whereby the rotation of the dogs operates to secure and lock the connector in place.

On release, the pivoting dog operates against the upper edge of the outer surface so that it is firmly rotated free of the shoulders to which it latches.

BRIEF DESCRIPTION OF THE DRAWINGS

FIG. 5 is a detailed sectional elevation of the details of the dog area for an alternate embodiment.

DESCRIPTION OF THE PREFERRED EMBODIMENT

Figure 1:
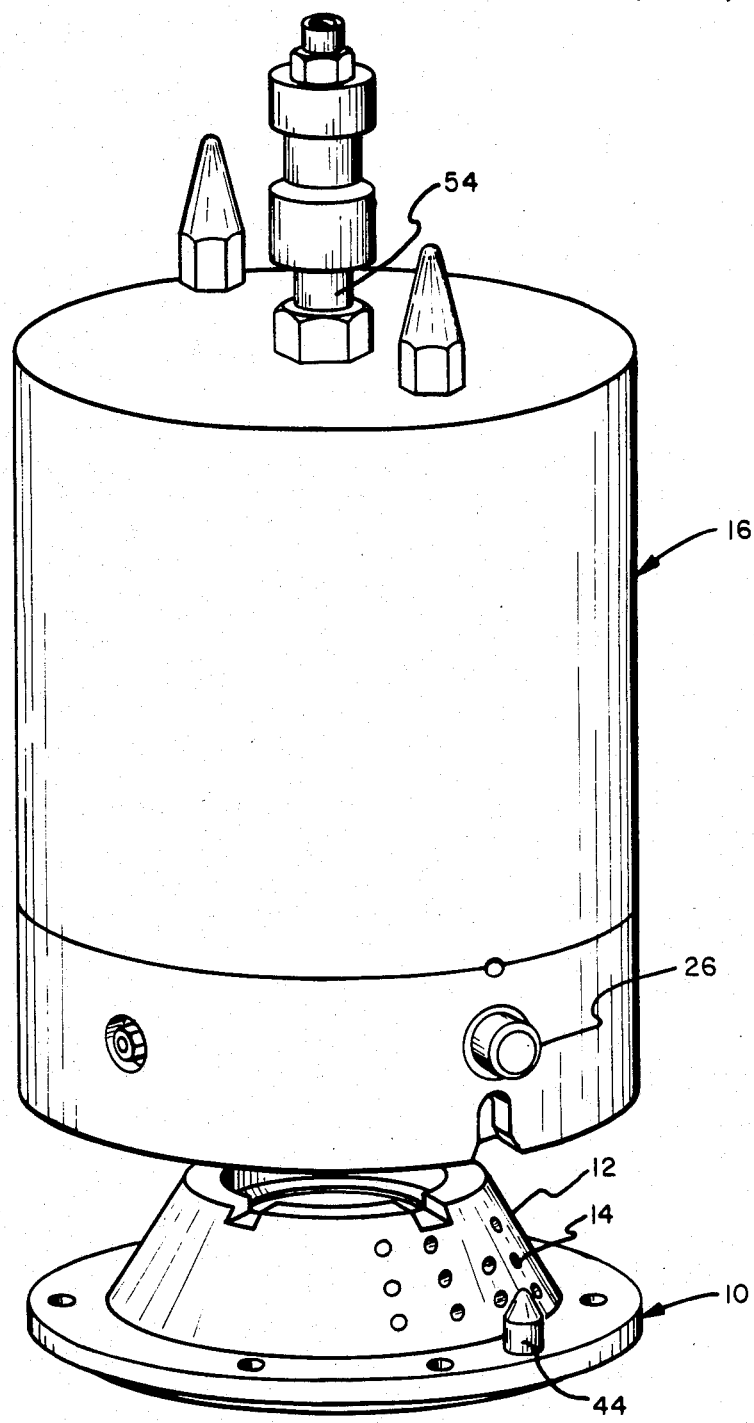
FIG. 1 is a general isometric view of the connector.
Figure 2:
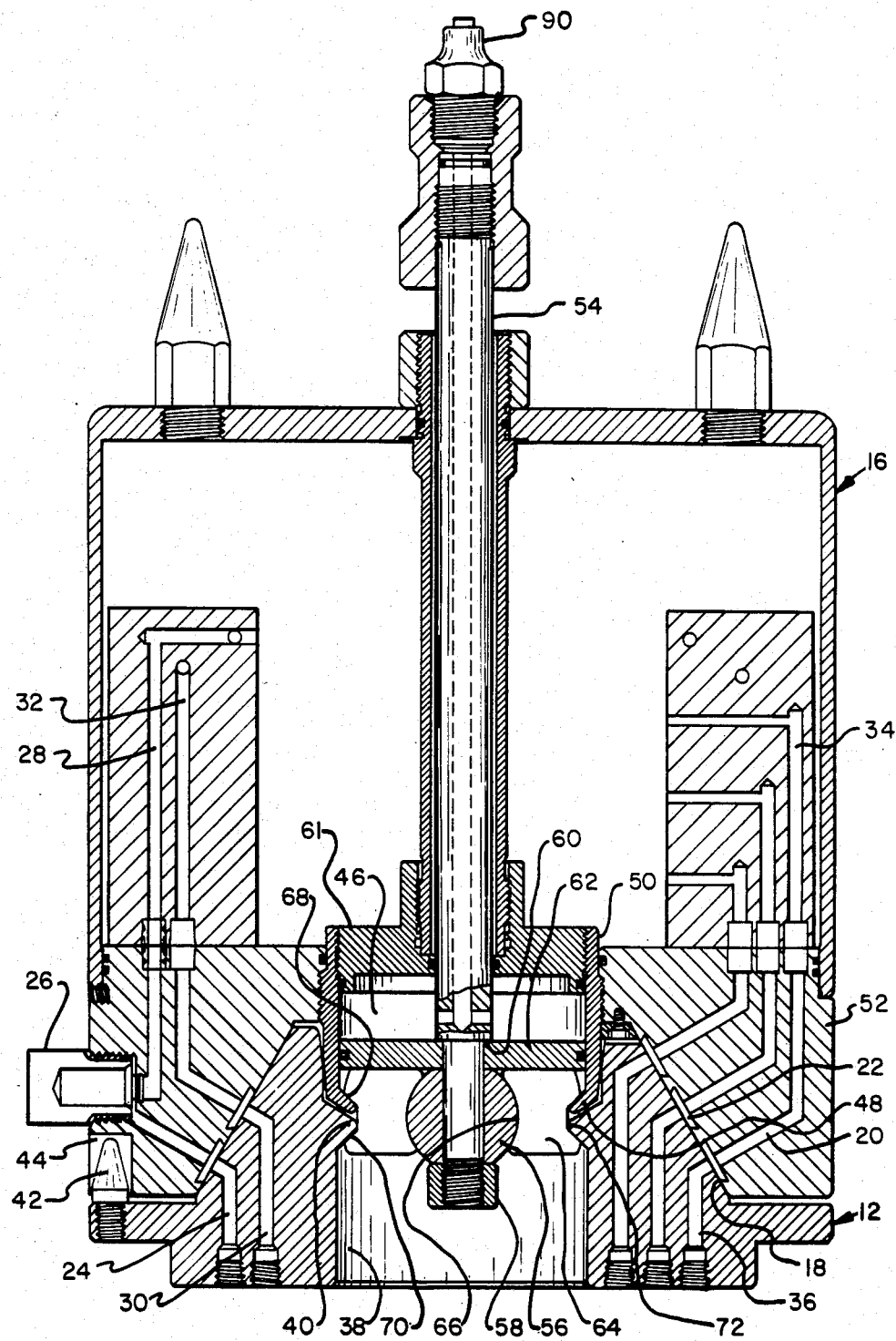
FIG. 2 is a sectional side elevation of the connector.

FIG. 1 is a isometric general view of the connector. A lower fixed male interface member 10 is permanently secured to the production tree. An upwardly facing conical surface 12 has therein a plurality of fluid openings 14. Some of these fluid openings are in fluid communication with a source of hydraulic pressure (not shown) while others convey hydraulic fluid to valve operators (not shown).

A control pod 16 which is an upper removable female interface member carries within it a plurality of pilot valves and control valves for the purpose of controlling and directing hydraulic fluid to the appropriate valve operators. This includes a downwardly facing conical surface 18 also having a plurality of fluid openings 20 therethrough. The two members are adapted to mate and seal along the conical surfaces. The seal rings within annular grooves 22 facilitate this.

With the connector locked in place and sealed, hydraulic fluid for the pilot valves passes through opening 24 and filter 26 to conduit 28. This fluid is directed by pilot valves which control the flow of the actuater driving fluid which passes in through opening 30 to the fluid conduit 32, thence through control valves and conduits 34 and 36 to the appropriate actuator (not shown).

The mating surfaces must be secured initially with sufficient force to avoid leakage of the hydraulic fluid when pressure is applied through the lines. At a later time when a large number of these lines contain hydraulic fluid at high pressure, it can be seen that the hydraulic fluid itself exerts considerable force attempting to separate the two members. It therefore is important that the connector assembly maintain these surfaces together with sufficient force to maintain good contact under the pressure up condition. This is particularly so since ocean current conditions operating on the equipment may tend to move it in a periodic motion thereby leading to fretting of the seal surfaces. The connector of my invention is well adapted to secure the members together in a manner to resist bending forces around the entire 360°.

The fixed member 12 has a vertical cylindrical opening 38 through its centerline and an inwardly extending annular shoulder 40 around its inner periphery. It also includes an alignment pin 42 fitting within slot 44 to assure proper alignment of the fluid passages between the two members.

The removable female member 16 includes a vertical cylindrical opening 46 of 16.5 cm (6.5 inches) diameter through its centerline and an inwardly extending shoulder 48 around its inner periphery. The latch ring 50 is threadedly secured to the body 52 of the removable member and it is this latch ring which carries the inwardly facing shoulder. This provides for adjustment of the shoulder with relation to the conical surface, which adjustment is made before the connector is run.

A centrally located axially extending latch rod 54 has a push member in the form of a spherical ball 56 of 7.6 cm (3 inches) diameter secured to the lower end. Nut 58 threaded to the latch rod bears against a flat on the bottom of the sphere 56 to retain this sphere upwardly. Shoulder 60 operates to hold this sphere down, although in this embodiment it operates through the surfaces of piston 62, operating on a flat at the upper portion of the sphere. Accordingly, this sphere is securely entrapped and may be moved up and down with movement of the latch rod 54.

Eight outwardly extending lock dogs 64 each have the inner surface 66 complimentary with the outer surface of ball 56 and located in contact with the ball. It can be seen that these dogs are therefore slidable along the sphere vertically and rotate about the center point thereof.

The upper surface 68 of shoulder 48 and the lower surface 70 of shoulder 40 preferably form an acute angle. The dogs 64 have a horizontal circumferentially extending groove 72 around the outer surface with the groove being complimentary with the shoulder surfaces 68 and 70. Extension of the shoulder surfaces 68 and 70 interset at loading point 74 which is the point through which load is effectively transmitted to load surfaces 68 and 70 toward one another. If this ball center were located at the elevation, then loading would be a maximum.

It is preferable that these shoulders with surfaces 68 and 70 be continuous around the circumference. They must however, be opposing portions of the opening so that the outwardly moving dog portions will operate against substantially opposite sides.

It can be observed that with the dogs sliding around the sphere the maximum radial dimension at any point on the dog occurs when that point is at the elevation of the center of the sphere. With the outer surfaces 76 and 78 of the dogs being spherical, the dogs may freely rotate within the cylinder since at no point does the outer surface of the dog exceed the spherical dimension. In the embodiment illustrated, this diameter is just less than the 16.5 cm (6½ inch) diameter of cylinder 46. This fixes the maximum diameter of the dog arrangement at any time, although various portions of dog will move inwardly and outwardly within this limit as they rotate around the sphere.

It can be seen that the maximum outward dimension of the groove and its surfaces is obtained when the sphere is at the same elevation as loading point 74. It is however preferred that the sphere continue to elevation 80 which is 2 mm (1/16th inch) below the loading point. While this relaxes the load slightly, it provides an over-center condition ensuring that forces against the dog will not release the lock. the ball is considered at substantially the same elevation as the shoulders when its center is approximately the elevations of the loading point 74.

At all times during the locking and unlocking operation, an upper portion 81 of each dog remains above the center of the ball 56. This provides capability to exert the required upward force on the inner edge of each dog to accomplish the required rotation.

The outer surfaces of the dogs are preferably spherical because such shape assures that no portion of the dogs can protrude beyond the surface 91 of cylinder 90 regardless of their position.

Figure 3:
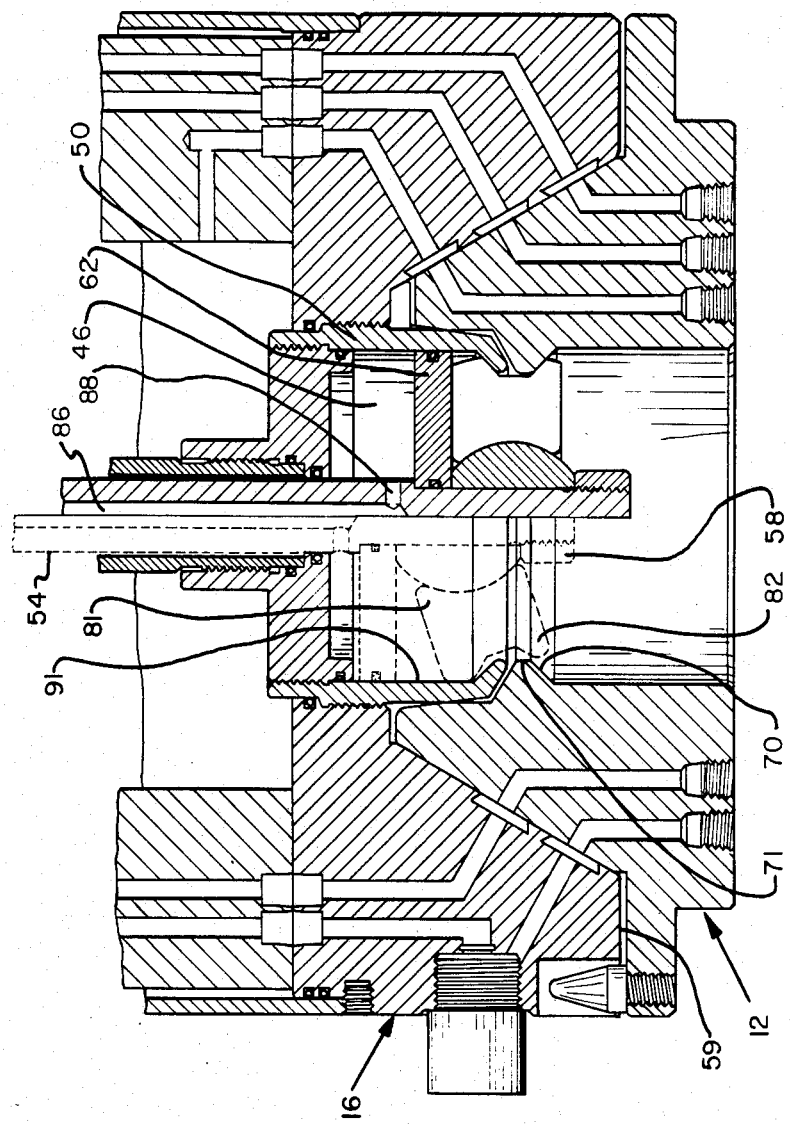
FIG. 3 is a sectional elevation of the latching mechanism.
Figure 4:
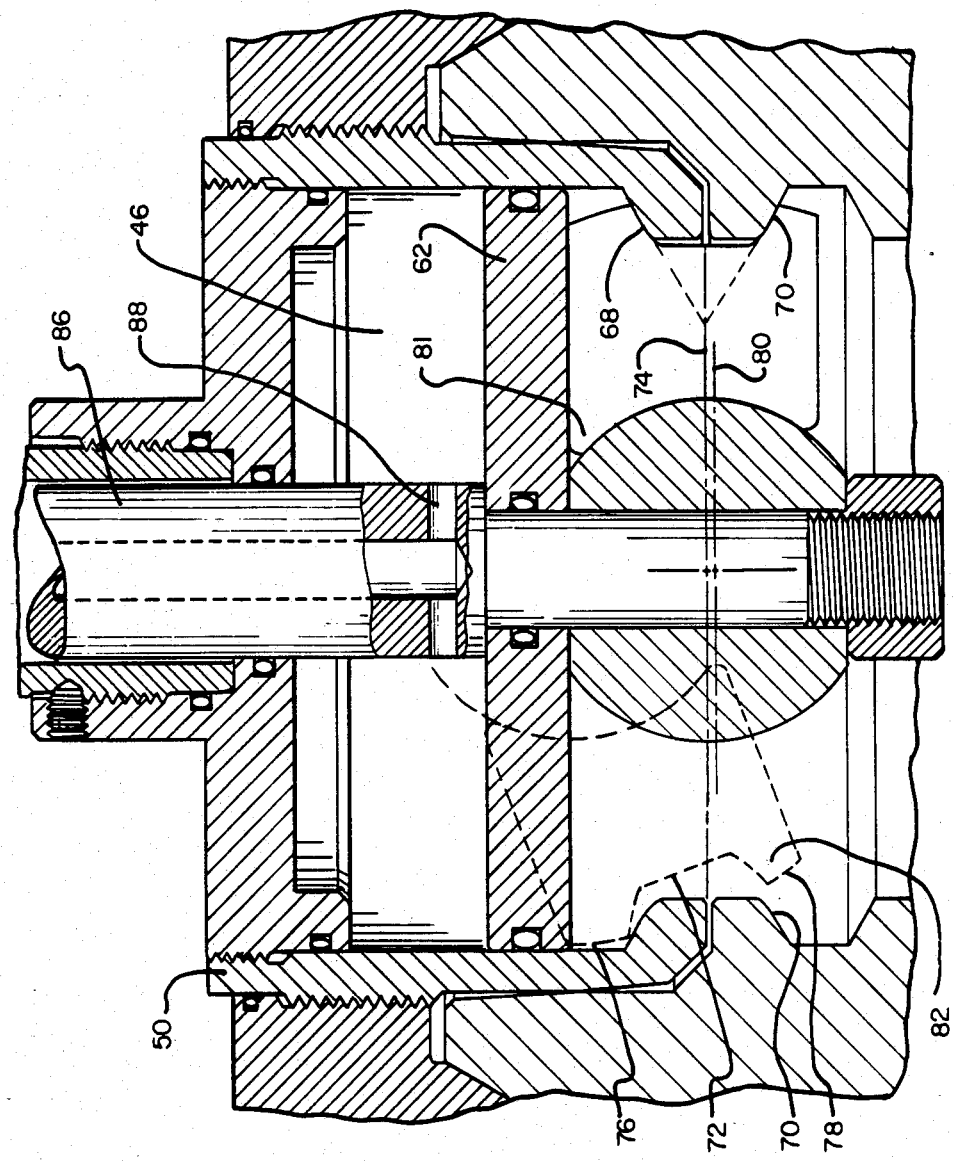
FIG. 4 is a more detailed view of the latching dog area of FIG. 3.
Figure 6:
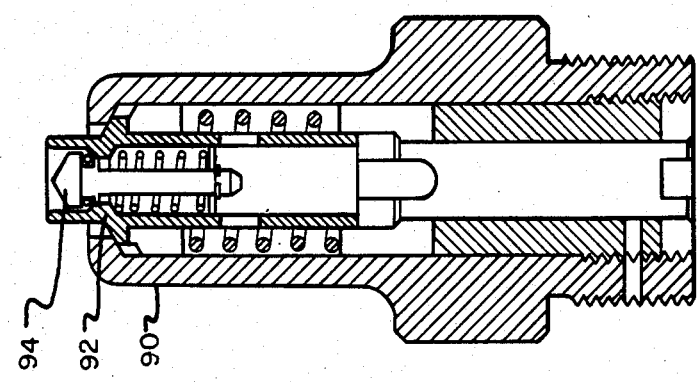
FIG. 6 is a sectional side elevation of the vent check valve.

With the latch rod fully up the dogs rotate to the position shown on the left side of FIGS. 3 and 4 wherein the lower edge 82 of each dog is moved radially inwardly thereby clearing the bearing surface 70. This disengages the connector so that the upper portion may be withdrawn. With the dogs in the position illustrated, the distance between the contacting surface 71 and surface 70 measured perpendicular to the surface 70 is about one cm (⅜ of an inch). When the connector is being made up, this accepts a condition where the connector is stabbed to a location within one cm from the final position, with the dogs pulling the connector into precise location as they rotate into their horizonal position.

It may also be noted that during stabbing the latch ring 50 passes within body 52 prior to the dogs reaching the elevation of shoulder 40. Accordingly, axial alignment of the connector is provided so that the dogs in the unlatched position will clear the shoulder.

The latch rod is further provided with an opening 86 and an opening 88 so that hydraulic fluid may be passed through into chamber 46 located above piston 62. While the dogs may be latched by a downward force on the rod, hydraulic pressure into the chamber 46 may be used instead of or in addition to, the vertical downward force thereby providing a force to lock and hold the dogs in place.

At the upper end of the latch rod is a vent check valve 90. Upon making a connection to this valve, application of hydraulic pressure will open the check piston 92 thereby permitting pressure to flow into the opening through the latching rod. Check piston 94 will be inoperative at this time, but upon disconnection of the hydraulic line this piston will operate to limit the pressure within the hydraulic cylinder to a maximum amount. This permits the locked in pressure to aid in maintaining the lock of the connector. For disconnection, the piston 92 is physically pushed down thereby relieving pressure. A pull on the latch rod then forces the hydraulic fluid out of the chamber 46.

Referring to FIG. 3, the elevation of latch rod 54 and nut 58 is higher than that of the bottom surface 59 of the female member 16 when in the unlatched condition. The member 16 may therefore be set on the deck prior to running, without any special holding apparatus.

While the dogs are spaced equally around the perimeter of the connector, they can not be dimensioned so they occupy the entire circumference of the connector at all times. At the elevation of the center of sphere, there would be, for the outer edge of the dogs, a theoretical maximum circumference. However since the dogs must rotate from this position the outer portions of the dog actual have a lesesr perimeter. The width of the dogs must be dimished to allow for this, whereby in the horizontal position they will not be able to fill the entire circumference.

While the spherical outside shape of the dogs has the advantage described, there is the theoretical possibility that, should something cause the lower lip of the dog to hang up, it will rotate prematurely before engagement. The alternate embodiment of FIG. 5 has a limited cylindrical section 102 in the releasable member with a reduced diameter portion 104 immediately above it. The upper edge 106 of each dog is of sufficient length such that in its tilted condition it has a diameter greater than that of portion 104 so that it fits within groove 102. This provides positive insurance against premature rotation of the dogs into the locked position before the sphere is moved downwardly.

In each of the embodiments, a positive disengagement is achieved since raising the ball rotates the dogs around the pivot point at the upper end of the dogs so that the latch is disengaged with a positive rotation force. Accordingly, there is no reliance on dogs moving free under moderate force conditions as is experienced with some prior art connectors.

In preparation for running the connector, the latch ring 50 must be appropriately adjusted with respect to the main body 52. This may be accomplished by either measurements relating the downwardly facing surface 36 to upper surface 68 of the latch ring 50, with knowledge of the relationship to be obtained between the upwardly facing shoulder 68 and the downwardly facing shoulder 70. Alternatively, the upper member of the connector may be placed on a dummy wellhead arrangement on the deck and a latch ring adjusted until the proper dimension between the upwardly facing shoulder 68 and the downwardly facing shoulder 70 are obtained.

The locked dogs 64 may be inserted through the top with end section 61 removed. This may be done where at least the upper lip 81 or each dogs spherical. The dogs may be placed in the cylinder at a sharp angle so the spherical ball 56 may be lowered to contact the interior surfaces. It may then be lower to the appropriate elevation and the end plate 61 reinserted.

Alternatively, the dogs 64 may be inserted from the bottom by removing nut 58 and engaging the locked dogs with the ball 56 at a lower elevation and raising it to fully assembled condition. The nut 58 is then assembled.

With the latch rod raised and the dogs in the unlatched condition, the upper member of the connector is lowered with conventional guidance to meet with the lower member which has been previously placed at the sea bed. Conventionally, gross alignment methods may be used with the alignment pin 42 effecting the final alignment of the connector so that the fluid openings are in proper alignment. While the downward force could physically be placed on latch rod 54, the connector is more appropriately locked by imposing hydraulic pressure through opening 86 and the chamber 46. This drives down piston 62, which moves down ball 56, in turn rotating the locking dogs 64 into the locked position. Preferably the system is arranged so that the ball continues about 2 mm (1/16 of an inch) beyond the dead center condition.

I claim:

1. A control pod connector assembly comprising:
   a lower fixed member having an upwardly facing interface surface, and a plurality of fluid openings therein;
   an upper removable member having a downwardly facing interface surface with a plurality of fluid openings therein adapted to mate with the corresponding fluid openings of said lower member;
   means for sealing around the mated fluid openings;
   said lower member having a centrally located vertical cylindrical opening and an inwardly extending annular first shoulder;
   said upper member having a centrally located vertical cylindrical opening and an inwardly extending annular second shoulder;
   said first and second shoulders in close proximity when the two member are mated, the upper surface of said second shoulder and the lower surface of said first shoulder converging toward the center of said cylindrical openings;
   a centrally located axially extending latch rod;
   a spherical ball secured to the end of said latch rod;
   a plurality of outwardly extending lock dogs each having an inner surface complimentary with said ball and located in contact with said ball, the outer surface having a horizontally circumferentially extending groove complimentary with said first and second shoulders;
   said dogs when in contact with said ball having an outer surface of a diameter greater than the inside diameter of said first and second shoulders, but less than the inside diameter of the vertical opening through said upper member;
   means for securing said ball at a locking elevation substantially that of said shoulders;
   means for axially moving said ball to a position remote from said locking elevation whereby said lock dogs rock loose from said shoulders.

2. A control pod connector assembly as in claim 1:
said upper member comprising a main body including said interface surface, and a latch ring axially adjustably secured internal of said main body, said second shoulder located on said latch ring.

3. A control pod connector assembly as in claim 2:
said second shoulder being continuous around the circumference of said latch ring.

4. A control pod connector assembly as in claim 2:
said second shoulder having the upper surface axially downwardly and radially inwardly extending.

5. A control pod connector assembly as in claim 4:
the surface of said first shoulder axially upwardly and radially inwardly extending.

6. A control pod connector assembly as in claim 1:
said upper member having a cylindrical inner surface above said shoulder;
a closure at the top of the cylindrical surface, said rod extending through said closure;
and means forming a seal between said rod and closure;
a piston secured to said rod and slidable against said cylindrical inner surface, thereby forming a pressurized chamber above said piston;
an opening through said rod from the top thereof to the pressurized chamber;
means for introducing fluid into said chamber.

7. A control pod connector assembly as in claim 6:
means for holding pressure within said pressurized chamber located on said latch rod; and means for selectably releasing said pressure.

8. A control pod connector assembly as in claim 6:
said upper member having a full diameter portion of said cylindrical surface above said second shoulder and a reduced diameter portion of said vertical cylindrical surface located above said full diameter portion; said dogs when in contact with said ball having an outer surface of a diameter greater than that of said reduced diameter portion.

9. A control pod connector assembly as in claim 1:
said upper member having a full diameter portion of said vertical cylindrical opening above said second shoulder and a reduced diameter portion of said vertical cylindrical opening located above said full diameter portion; said dogs when in contact with said ball having an outer surface of a diameter greater than that of said reduced diameter portion.

10. A control pod connector assembly as in claim 1:
the upper surface of said second shoulder and the lower surface of said first shoulder forming an acute angle with respect to each other.

11. A control pod connector assembly as in claim 1:
said dogs when in contact with said ball having a spherical outer surface.

12. A control pod connector assembly as in claim 1:
said upper member comprising a main body including said interface surface, and a latch ring axially adjustably secured internal of said of main body, said second shoulder located on said latch ring, and said upper member having a cylindrical inner surface above said shoulder;
a closure at the top of the cylindrical surface, said rod extending through said closure;

and means forming a seal between said rod and closure;

a piston secured to said rod and slidable against said cylindrical inner surface, thereby forming a pressurized chamber above said piston;

an opening through said rod from the top thereof to the pressurized chamber;

means for introducing fluid into said chamber;

means for holding pressure within said pressurized chamber located on said latch rod; and means for selectably releasing said pressure.

13. A control pod connector assembly as in claim 12:

said upper member having a full diameter portion of said vertical cylindrical opening above said second shoulder and a reduced diameter portion of said vertical cylindrical opening located above said full diameter portion; said dogs when in contact with said ball having an outer surface of a diameter greater than that of said reduced diameter portion.

14. A control pod connector assembly as in claim 12:

said dogs when in contact with said ball having a spherical outer surface.

15. A subsea connector assembly comprising:

a first fixed member having an upwardly facing interface surface, a vertical opening through its center, a first inwardly facing shoulder located on the opposing portions of said opening;

a second removable member having a downwardly facing interface surface complimentary with said upwardly facing surface, a vertical opening through its center and a second inwardly facing shoulder in close proximity to and in substantial vertical alignment with said first inwardly facing shoulder;

the lower surface of said first shoulder and the upper surface of said second shoulder converging toward the centerline of the openings through said members;

a plurality of fluid openings in each interface surface for transmitting hydraulic fluid between said members;

means for aligning said members with said fluid openings in alignment;

and means for sealing around said aligned fluid openings;

a vertically extending centrally located latch rod extending through and secured to said second member;

a push member secured to said rod having arcuate surfaces around horizontal centerlines of the member in opposing directions and facing toward said inwardly facing shoulders;

a plurality of oppositely extending dogs, each having an inner arcuate surface in contact with an arcuate surface of said push member, and having a grooved outer surface complimentary with and aligned with said first and second shoulders;

means for locating said push member at a locking elevation elevation substantially the same as that of said first and second shoulders, said dogs being entrapped between said push member and said shoulder, and compressably engaging said first member; and means for axially moving said push member to a position remote from said locking elevation whereby said dogs rock loose form said shoulders.

16. A subsea connector assembly as in claim 15:

said second shoulder having the upper surface axially downwardly and radially inwardly extending.

17. A subsea connector assembly as in claim 15:

said second member having a full dimension portion of said vertical opening above said second shoulder and a reduced dimension portion of said vertical opening located above said full dimension portion; said oppositely extending dogs when in contact with said push member having an outer surface of an overall dimension greater than that of said reduced dimension portion, but less than said full dimension portion.

18. A subsea connector assembly as in claim 15:

said second member having a cylindrical inner surface above said shoulder;

a closure at the top of the cylindrical surface, said rod extending through said closure;

and means forming a seal between said rod and closure;

a piston secured to said rod and slidable against said cylindrical inner surface, thereby forming a pressurized chamber above said piston;

an opening through said rod from the top thereof to the pressurized chamber; and means for introducing fluid into said chamber.

19. A control pod connector assembly comprising:

a lower fixed male member having an upwardly facing conical surface, and a plurality of fluid openings therein;

an upper removable female member having a downwardly facing conical surface with a plurality of fluid openings therein adapted to mate with the corresponding fluid openings of said male member;

means for sealing around the mated fluid openings;

said male member having a centrally located vertical cylindrical opening and an inwardly extending downwardly facing annular first shoulder, the lower surface of said first shoulder inwardly and upwardly extending;

said female member having a centrally located vertical cylindrical opening and an inwardly extending upwardly facing annular second shoulder;

said first and second shoulders in close proximity, imaginary extension of the upper surface of said second shoulder and the lower surface of said first shoulder forming an angle;

a vertically extending latch rod centrally located axially within said female member;

a spherical ball secured to the end of said latch rod;

a plurality of outwardly extending lock dogs each having an inner surface complimentary and said ball and located in contact with said ball, the outer surface having a horizontally circumferentially extending groove with upper and lower surfaces complimetary with first and second shoulders;

said dogs when in contact with said ball having an outer surface of a diameter greater than the inside diameter of said first and second shoulders, but less than the inside diameter of the vertical opening through said female member;

means for securing said ball at a locking elevation substantially that of said shoulders;

means for axially moving said ball to a position remote from said locking elevation whereby said lock dogs rock loose from said shoulder.

20. A control pod connector assembly as in claim 19:

said female member comprising a main body including said conical surface, a latch ring axially adjustably secured internal of said main body, said second shoulder located on said latch ring.

21. A control pod connector assembly as in claim 20:

said second shoulder being continuous around the circumference of said latch ring, and;

having the upper surface axially downwardly and radially inwardly extending.

22. A control pod connector assembly as in claim 19:

said female member having a cylindrical inner surface above said shoulder;

a closure at the top of the cylindrical surface, said rod extending through said closure;

and means forming a seal between said rod and closure;

a piston secured to said rod and slidable against said cylindrical inner surface, thereby forming a pressurized chamber above said piston;

an opening through said rod from the top thereof to the pressurized chamber;

means for introducing fluid into said chamber.

23. A control pod connector assembly as in claim 22:

means for holding pressure within said pressurized chamber located on said latch rod, and means for selectably releasing said pressure.

24. A control pod connector assembly as in claim 22:

said upper member having a full diameter portion of said vertical cylindrical opening above said second shoulder and a reduced diameter portion of said vertical cylindrical opening located above said full diameter portion; said dogs when in contact with said ball having an outer surface of a diameter greater than that of said reduced diameter portion.

25. A control pod connector assembly as in claim 19:

said upper member having a full diameter portion of said vertical cylindrical opening above said second shoulder and a reduced diameter portion of said vertical cylindrical opening located above said full diameter portion; said dogs when in contact with said ball having an outer surface of a diameter greater than that of said reduced diameter portion.

26. A control pod connector assembly as in claim 19:

the lowest edge of said female member extending to a lower elevation than said latch rod and spherical ball, when in the unlocked condition, whereby said female member may rest on a flat surface without interference of said latch rod.

* * * * *